United States Patent
Yalpani (10) Patent No.: US 7,030,208 B2
(45) Date of Patent: Apr. 18, 2006

(54) BIOCOMPATIBLE MATERIALS AND PROBES

(75) Inventor: Manssur Yalpani, Rancho Sante Fe, CA (US)

(73) Assignee: CarboMer, Inc., San Diego, CA (US)

( * ) Notice: Subject to any disclaimer, the term of this patent is extended or adjusted under 35 U.S.C. 154(b) by 0 days.

(21) Appl. No.: 10/411,972

(22) Filed: Apr. 11, 2003

(65) Prior Publication Data

US 2003/0199687 A1 Oct. 23, 2003

Related U.S. Application Data

(60) Provisional application No. 60/372,500, filed on Apr. 11, 2002.

(51) Int. Cl.
*C08G 69/10* (2006.01)

(52) U.S. Cl. .................. 528/328; 525/430; 528/310

(58) Field of Classification Search .................. 524/48, 524/805; 428/522; 525/327.1, 329.1, 403, 525/408, 409, 410, 411, 417, 430; 528/310, 528/328

See application file for complete search history.

(56) References Cited

U.S. PATENT DOCUMENTS

| | | | |
|---|---|---|---|
| 3,489,504 A | 1/1970 | Englert et al. | |
| 5,116,599 A | 5/1992 | Rogers, Jr. et al. | |
| 5,155,194 A | 10/1992 | Kossmehl et al. | |
| 5,652,347 A | 7/1997 | Pouyani et al. | |
| 5,798,406 A | 8/1998 | Feret et al. | |
| 5,824,335 A | 10/1998 | Dorigatti et al. | |
| 5,902,795 A | 5/1999 | Toole et al. | |
| 6,019,959 A | 2/2000 | Platzek et al. | |
| 6,054,492 A | 4/2000 | Kabanov et al. | |
| 6,156,937 A | 12/2000 | Marchionni et al. | |
| 6,203,777 B1 | 3/2001 | Schroder | |
| 6,218,464 B1 | 4/2001 | Parker et al. | |
| 6,245,319 B1 | 6/2001 | Quay | |
| 6,274,677 B1 | 8/2001 | Tatemoto et al. | |

FOREIGN PATENT DOCUMENTS

| EP | 0 563 978 A2 | 10/1993 |
|---|---|---|
| WO | WO 89/03693 | 5/1989 |
| WO | WO 91/12824 | 9/1991 |
| WO | WO 94/03210 | 2/1994 |

OTHER PUBLICATIONS

"Organic Chemistry", by J. McMurry Brooks Cole Publishing Co, 1988, pp. 970-973.*

* cited by examiner

*Primary Examiner*—Helen L. Pezzuto
(74) *Attorney, Agent, or Firm*—Saliwanchik, Lloyd & Saliwanchik (57) ABSTRACT

The present invention relates to fluorinated biopolymer and polymer derivatives useful as imaging probes, diagnostic agents and contrast agents and to imaging methods employing the fluorinated biopolymers and polymers.

1 Claim, 1 Drawing Sheet

FIG. 1

BIOCOMPATIBLE MATERIALS AND PROBES

CROSS-REFERENCE TO A RELATED APPLICATION

This application claims the benefit of provisional patent application Ser. No. 60/372,500, filed Apr. 11, 2002, which is hereby incorporated by reference in its entirety.

FIELD OF THE INVENTION

The present invention relates to fluorinated biopolymer and polymer derivatives useful as imaging probes, diagnostic agents and contrast agents and to imaging methods employing the fluorinated biopolymers and polymers.

BACKGROUND

Hyaluronic acid (or hyaluronan, HA) is a high molecular weight copolymer of 1→3-β-linked N-acetyl-D-glucosamine-1→4-β-D-glucuronic acid from the glycosaminoglycans family of biopolymers with unusual rheological properties. Its physiological functions include the lubrication and protection of cells, maintenance of tissue structural integrity, and transport of molecules to and within cells. HA is found in the extracellular matrix (ECM) and plays an integral role in its organization and structure. Hyaluronan influences cellular proliferation and migration in developing, regenerating and remodeling tissues and in tissues undergoing malignant tumor-cell invasion (see, e.g., B. P. Toole S. D. Banerjee, Oligosaccharides reactive with hyaluronan-binding protein, monoclonal antibodies recognizing hyaluronan-binding protein, and use in cancer therapy, U.S. Pat. No. 5,902,795, 1999; S. Kumar, D. West, D. B. Rifkin, M. Klagsburn (eds.) Hyaluronic acid and its degradation products modulate angiogenesis in vivo and in vitro. In *Current Communications in Molecular Biology; Angiogenesis: Mechanism and Pathobiology*, Cold Spring Harbor Laboratory, Cold Spring Harbor, N.Y., pp. 90–94, 1987.).

HA binds specifically to proteins in the ECM, within the cytosol and on cell-surface receptors. The prevalence of hyaluronan-binding proteins indicates the importance of HA recognition in tissue organization, proliferation and differentiation, growth factor activities, and the control of cellular adhesion and motility. HA's role extends to embryonic development, modulation of inflammation, stimulation of angiogenesis and wound healing, and morphogenesis.

A number of extracellular matrix and cellular proteins, the hyaladherins, have specific affinities to HA within the extracellular matrix. These include aggrecan, cartilage link-protein, hyaluronectin, neurocan and versican. Cellular hyaluronan receptors such as CD44 (CD="cluster of differentiation") and RHAMM (receptor for hyaluronate-mediated motility) are also known. Recent evidence implicates the CD44-HA interaction in cancer metastasis (for reviews, see Entwistle, J.; Hall, C. L.; Turley, E. A. *J. Cell. Biochem.*, 61, 569–577, 1996; Bajorath, J. *Proteins: Struct. Funct. Genet.*, 39, 103–111, 2000.). Melanoma cells expressing high CD44 levels show increased cell motility and metastatic potential compared to the same cell types that expressed low receptor levels (see e.g., Birch, M.; Mitchell, S.; Hart, I. *Cancer Res.*, 51, 6660–6667, 1991.). The presence of specific HA cell receptors provides therefore potential uses in cancer diagnosis and therapy. Other biomedical uses include cataract surgery, osteoarthritis, and prevention of post-surgical adhesions. HA also displays useful wetting and moisture-preserving functions that are of interest in cosmetic and topical medical areas. HA sources include rooster combs, umbilical cords, shark skin, bull's eye and fermentation.

The integrin receptor family binds to ECM receptors (S. M. Abelda, Role of integrins and other cell adhesion molecules in tumor progression and metastasis, *Lab Invest.*, 68, 4–17, 1993.). Integrins are heterodimeric glycoproteins with two subunits (α and β). A given β-subunit can pair with a number of α-subunits, resulting in various integrins with unique binding properties. Thus, α2β1 constitutes a collagen receptor that does not interact with laminin on platelets (C. J. Anderson, *Bioconjugate Chem.* 12, 1057–65, 2001.)

Normal human tissue cells express various integrins such as α1β1, α2β1, α3β1, and α6β1 that are required for adhesion to collagen and laminin (J. L. Lauer, C. M. Gendron, G. B. Fields, Effect of ligand conformation on melanoma cell alpha3beta1 integrin mediated signal translocation event Implication for a collagen structural modulation mechanism of tumor cell invasion, *Biochemistry*, 37, 5279–87, 1998.). Radiolabeled ECM fragments are useful imaging agents since their integrins are upregulated in certain tumors and can be targeted for diagnosis and therapy. Integrins promote adhesion, signal transduction and linkage between intracellular proteins and ligands. ECM fragments are used as imaging agents as their integrins are upregulated in certain tumor types and can be targeted for diagnostic or therapeutic use.

The ubiquitous nature of HA in biological systems, coupled with its antitumor and diverse range of other medical activities make diagnostic probe-carrying HA derivatives attractive for diagnostic and therapeutic uses. There is furthermore growing evidence that oligosaccharides derived from hyaluronan also bind to CD44. Thus, if an antagonist could be found for the CD44 receptor that would prevent HA binding, it would be possible consequently to limit metastasis. Such small molecules would have advantages over HA itself in that they would possibly be water soluble, membrane penetrating, and easy to administrate. Minimally, a 6-mer (hexasaccharide) is required for binding to CD44 and the 10-mer (decasaccharide) is required to displace HA from the HA-CD44 complex.

Other acidic polysaccharides, such as alginate and pectin are possibly also biologically active, as some evidence indicates in the literature (A. Kawada, N. Hiura, S. Tajima, H. Takahara, Alginate oligosaccharides stimulate VEGF-mediated growth and migration of human endothelial cells, *Arch. Dermatol. Res.*, 291, 542–7, 1999; M. Sakurai, H. T. Matsumoto, H. Kiyohara, H. Yamada, B-cell proliferation activity of pectic polysaccharides from a medicinal herb, *Immunology*, 97, 540–7, 1999; H. Yamada, Contribution of pectins on health care, in J. Visser, A. G. J. Voragen eds., *Pectins and Pectinases*, Elsevier, Amsterdam, 173–190, 1996; H. Yamada, H. Kiyohara, Complement-activating polysaccharides from medicinal herbs, in H. Wagner ed., *Immunomodulatory Agents from Plants*, Birkhauser Verlag, Basel, 1999.). The preparation of alginate oligosaccharides (A, Martinsen, G. Skjak-Braek, O. Smidsrod, *Carbohydr. Polym.*, 15, 171–173, 1991. Ikeda, H-F, A. A Takemura, H Ono, *Carbohydr. Polym.*, 42, 421–425, 2000.) and pectic oligosaccharides (N. O. Maness, A. J. Mort, *Anal. Biochem.*, 178, 248–254, 1989.) has been reported.

Hyaluronan has attracted considerable interest as biocompatible, resorbable material for tissue engineering and a wide range of other biomedical applications (for reviews, see D. Campoccia, P. Doherty, M. Radice, P. Brun, G. Abatangelo, D. F. Williams, Semisynthetic resorbable materials from hyaluronan esterification, *Biomaterials*, 19, 2101–2127, 1998; E. Milella, E. Brescia, C. Massaro, P. A. Ramires, M. R. Miglietta, V. Fiori, P. Aversa, Physico-chemical properties and degradability of non-woven hyaluronan benzylic esters as tissue engineering scaffolds, *Biomaterials*, 23, 1053–1063, 2002.) A considerable number of hyaluronan derivatives have been reported (see, e.g., K. P. Vercruysee, G. D. Prestwich, Hyaluronate derivatives in drug delivery, *Crit. Rev. Therapeut. Carrier Syst.*, 15, 514–555, 1998; Y. Luo, G. D. Prestwich, Hyaluronic acid-N-hydroxysuccinimide: a useful intermediate for bioconjugation, *Bioconjugate Chem.* 12, 1085–88, 2001.). Collagen, the other major component of the extracellular matrix, constitutes over 30% of the human protein content and is associated with a number of diseases. Collagen has therefore been similarly widely employed as biocompatible matrix, as have hybrid materials derived from collagen and hyaluronan (S.-N. Park, J.-C. Park, H. O. Kim, M. J. Song, H. Suh, Characterization of porous collagen/hyaluronic acid scaffold modified by 1-ethyl-3-(3-dimethylaminopropyl)carbodiimide cross-linking, *Biomaterials*, 23, 1205–1212, 2002). Collagen features an unusual amino acid composition: glycine constitutes over 30%, proline and hydroxyproline about 20%, whilst it lacks tryptophan and cysteine (i.e., no disulfide bonds).

Poly(glutamic acids), and in particular poly(γ-glutamic acid) (γ-PGA) are new biodegradable materials with many potential biomedical uses (I.-L. Shih, Y.-T. Van, The production of poly(γ-glutamic acid) from microorganisms and its various applications, *Bioresource Techn.*, 79, 207–225, 2001). γ-PGA, elaborated by various *Bacillus* species (e.g., *B. licheniformis*), is an unusual polypeptide with its glutamic acid residues linked linearly through the γ-carboxyl function. γ-PGA assumes an a-helix conformation in solution, and, unlike the synthetic α-PGA analog, is a well-defined, high molecular weight homopolymer.

γ-PGA's polyanionic nature renders it highly water soluble and permits modulation of its solution conformation by co-solutes. PGAs ability to undergo conformational changes in response to different pH values offers the potential to affect targeted delivery. γ-PGA features a high molecular weight range and different solution conformations, is biocompatible, biodegradable (it biodegrades to glutamic acid monomers), non-toxic, and non-immunogenic nature. γ-PGA is also highly mucoadhesive, a key feature for localizing it site-specifically as a drug delivery vehicle in the small intestinal or colonic mucosa.

Radiolabeled peptide hormone analogues are of interest as diagnostic and therapeutic vehicles for treating cancer (Cutler C. S. Lewis J. S. Anderson C. J. *Adv. Drug Deliv. Res.*, 37, 189–211, 1999. Anderson C. J. Welch M. J., Chem. Rev., 99, 2219–2234, 1999.; Anderson C. J. Dehdashti F Cutler P. D. Schwarz S W. Laforet R. Bass L. R. Lewis J. S. McCarthy D. W., *J. Nucl. Med.*, 42, 213–2334, 2001.). These radiolabeled peptide receptor ligands can target upregulated cell surface receptors on tumors. For example, $^{111}$In-DTPA-octreotide is employed for imaging of neuroendocrine tumors that overexpress the somastatin receptor (E. P. Krenning, D. J. Kwekboom, W. H. Bakker, W. A. P. Breeman, P. P. M. Kooji, H. Y. Oei, M. van Hagen, P. T. E. Postema, M. de Jong, J. C. Reubi, T. J. Visser, A. E. M. Reji, L. L. J. Holland, J. W. Kuuper, S. W. J. Lamberts, Somatostatin receptor scintography with [111In-DTPA-D-Phe] and [111In-Tyr³]octreotide, *Eur. J. Nucl. Med.*, 20,716–731, 1993.).

Primary human tumors from colon, ovary, skin and stomach and their metastatic sites show high levels of α3β1, and similarly cultured human cell lines (e.g., breast, ovarian carcinoma) express α3β1. Non-invasive means of monitoring α3β1 expression could be useful as a diagnostic tool for assessing metastasis prior to surgery. Since natural collagens are integrin ligands radiolabeled collagen fragments can serve as imaging agents.

There is a considerable demand for versatile non-invasive diagnostic probes, and fluorine's diagnostic value is of particular interest in non-invasive imaging applications. Apolar oxygen imparts paramagnetic relaxation effects on $^{19}F$ nuclei associated with spin-lattice relaxation rates ($R_1$) and chemical shifts. This effect is proportional to the partial pressure of $O_2$ ($pO_2$). $^{19}F$ NMR can therefore probe the oxygen environment of specific fluorinated species in cells and other biological structures.

Nöth et al. (U. Nöth, P. Grohn, A. Jork, U. Zimmermann, A. Haase, J. Lutz, $^{19}F$-MRI in vivo determination of the partial oxygen pressure in perfluorocarbon-loaded alginate capsules implanted into the peritoneal cavity and different tissues, *Magn. Reson. Med.*, 42(6), 1039–47, 1999) employed perfluorocarbon-loaded alginate capsules in MRI experiments to assess the viability and metabolic activity of the encapsulated materials. Quantitative $^{19}F$-MRI was performed on perfluorocarbon-loaded alginate capsules implanted into rats, in order to determine in vivo the $pO_2$ inside the capsules at these implantation sites. Fraker et al. reported recently a related method with perfluorotributylamine (C. Fraker, L. Invaeradi, M. Mares-Guia, C. Ricordi, PCT WO 00/40252, 2000).

Although a large range of fluorinated products is available commercially, most PFCs suffer from a number of shortcomings. Many commercial PFCs currently employed for diagnostic purposes were originally selected for blood substitution. Their physicochemical properties [J. G. Reiss et al., *Biomat. Artif. Cells Artif. Organs*, 16, 421–430, 1988.] are therefore not targeted towards specific diagnostic or other biomedical uses, particularly for MRI. The molecular features of these PFCs are not optimized for high-sensitivity $^{19}F$-MRI studies. Their $T_1$ relaxation times are relatively long, $T_2$ relaxation times are short, and severe J-modulation effects and chemical shift artifacts can profoundly limit their MRI utility. Whilst their immiscibility in water offers benefits in some respects, it necessitates the use of emulsifiers. Thus, for PFC-in-water emulsions, such as F-44E, perfluorohexyl bromide (PFHB), perfluorooctyl bromide (PFOB, Perflubron™), perfluoromethyldecalin (PMD), perfluorooctyl ethane (PFOE), perfluorotripropylamine (FTPA), and the blood substitutes Fluosol™ and Oxygent™, lecithins or poloxamers are employed to disperse the PFCs and stabilize the emulsion. Fluosol™ was a 20% w/v mixture of 14% perfluorodecalin and 6% perfluorotripropylamine emulsified primarily with Pluronic F-68™. Oxygent™ is a 60% emulsion consisting mostly of PFOB and perfluoro-decylbromide, water, salts, and a lecithin. However, surfactants are problematic in that their use adds processing requirements and some of them can be unstable, chemically ill-defined or polydisperse, or cause potential undesirable side effects. Thus, Pluronic F-68™, the surfactant in Fluosol™, caused a transitory anaphylactic reaction in certain patients. Further, the stability of Pluronic F-68-based emulsions was limited; requiring frozen storage and mixing with two annex solutions prior to administration. The use of emulsions poses the additional disadvantage that the PFCs' fluorine content is effectively diluted (often by 50% or more), diminishing their spectral and imaging signal intensities and, hence diagnostic benefit. The impact of such dilutions is particularly evident in tumor oxygenation studies where only ~10% of the injected PFC emulsion dose reaches the tumor, necessitating time consuming $T_1$ measurements. This dilution effect is even more pronounced, when only a portion of the available PFCs' fluorine resonances is of diagnostic value. This is often the case, as severe chemical shift artifacts need to be circumvented by selectively exciting only a narrow chemical shift range containing one resonance (or a closely spaced group of resonances). Although F-44E, for instance, has a high fluorine content (74%) with largely acceptable spectral features, many MRI studies have selectively excited its trifluoromethyl resonance, representing only one third of the total F-content, which on emulsification (at 90%) is further diluted to ~22%. Similarly, for MRI with perfluorononane the choice is between the selective acquisition of the single trifluoromethyl resonance (6 fluorines with a spectral width of 50 kHz at 7 Tesla) or multiple difluoromethylene resonances (14 fluorines with a 1300 kHz spectral dispersion) (see, e.g., S. L. Fossheim; KA Il'yasov, J. Hennig, A. Bjornerud, *Acad. Radiol.*, 7(12), 1107–15, 2000.).

Ideally, PFC imaging agents should combine the following features: non-toxic, biocompatible, chemically pure and stable, low vapor pressure, high fluorine content, reasonable cost and commercial availability. Additionally, they should meet several $^{19}$F-NMR criteria, including a maximum number of chemically equivalent fluorines resonating at one or only few frequencies, preferably from trifluoromethyl functions. Some of the other spectral criteria have been discussed in detail elsewhere (C. H. Sotak, P. S. Hees, H. N. Huang, M. H. Hung, C. G. Krespan, S. Raynolds, *Magn. Reson. Med.*, 29, 188–195, 1993.). For MRI, it would furthermore be desirable to have control over the amount of magnetically responsive material for specific uses, and to employ temperature-responsive and pH-dependent imaging agents for special uses. These could have applications in MRI-based temperature monitoring for use in general hyperthermia treatment (see, e.g., S. L. Fossheim; K. A. Il'yasov, J. Hennig, A. Bjornerud, *Acad. Radiol.*, 7(12), 1107–15, 2000.) of tumors and for monitoring the efficacy of chemotherapy, respectively (see, e.g., N. Rhagunand, R. Martinez-Zagulan, S. H. Wright, R. J. Gilles, *Biochem. Pharmacol.*, 57, 1047–1058, 1999; I. F Tannock, D. Rotin, *Cancer Res.*, 49, 4373–4383, 1989.). Furthermore, water solubility would enhance the PFC functionality in many biomedical settings, as it would obviate the need for emulsifiers.

Although selected efforts have been directed at developing new fluorinated MRI probes, none are water soluble compounds [e.g., perfluoro-[15]-crown-5 ether)], and some are commercially unavailable [e.g., perfluoro-2,2,2',2'-tetramethyl-4,4'-bis(1,3-dioxalane)-PTBD]. It appears no attempts have so far focused on screening available PFCs from the thousands of commercial fluorinated products in order to identify potentially more suitable MRI probes for biomedical uses. It seems furthermore that no studies have attempted to establish structure activity relations (SARs) of related PFCs for MRI purposes. Noteworthy is also the fact that all PFCs examined to date have molecular weights under 1,000, typically between 400–600 Da. This is partly a reflection of the specific requirements for blood substitution agents, but also due to the widely held belief that higher molecular weight or polymeric fluorinated agents would not be detectable by $^{19}$F-NMR due to anticipated excessive line broadening, and would therefore be unsuitable. Thus, with the exception of the polymer-encapsulated PFCs noted above, this important class of materials had so far been excluded from consideration.

Paramagnetic ions, such as gadolinium ($Gd^{3+}$) decrease the $T_1$ of water protons in their vicinity, thereby providing enhanced contrast. Gadolinium's long electron relaxation time and high magnetic moment make it a highly efficient $T_1$ perturbant. Since uncomplexed gadolinium is very toxic, gadolinium chelate probes, such as gadolinium diethylenetriamine pentaacetic acid (GdDTPA $M_W$ 570 Da), albumin-GdDTPA (Gadomer-17, $M_W$ 35 or 65 kDa), have been employed extensively in MRI of tumors and other diseased organs and tissues. Several other developmental chelators have also been reported, including dual-labeled agents, oligonucleotide-derived, dextran-derived GdDTPA, and TAT and other peptide-derived chelators. However, presently approved MRI contrast agents are either not tissue specific, e.g., GdDTPA, or target only normal tissue, which limits their utility in diagnosis of metastases or neoplasia. MRI studies with GdDTPA, for instance, do not correlate with the angiogenic factor or the vascular endothelial growth factor (VEGF). Attempts have also been made to overcome the low relaxivities of small Gd-DTPA chelates by preparing polymer conjugates of $Gd(DTPA)^{(2-)}$ [see e.g., M. R. A. Duarte, M. G. Gil, M. H. Peters, J. A. Colet, J. M. Elst, L. Vander; R. N. Muller, C. F. G. C. Geraldes, *Bioconjug. Chem.*, 21, 170–177, 2001.]. However, the relaxivity of these polymer conjugates was only slightly improved and they were also cleared very quickly from the blood of rats, indicating that they are of limited value as blood pool contrast agents for MRI.

Whilst much can be achieved with currently available imaging and contrast agents, there are still unmet needs for novel diagnostic agents, particularly for those exploiting biological specificity. Imaging agents suitable for targeting metastases or neoplasia would substantially enhance the MRI sensitivity and utility for tumor detection and prevention. Although selected efforts have been directed at developing such new probes, a broader investigation of these agents is urgently needed. Similarly, new imaging probes are needed as noninvasive means to detect and image cells, tissues and organs undergoing apoptosis. An even greater demand exists for biocompatible materials in tissue engineering and various other biomedical applications.

SUMMARY OF THE INVENTION

Figure 1:
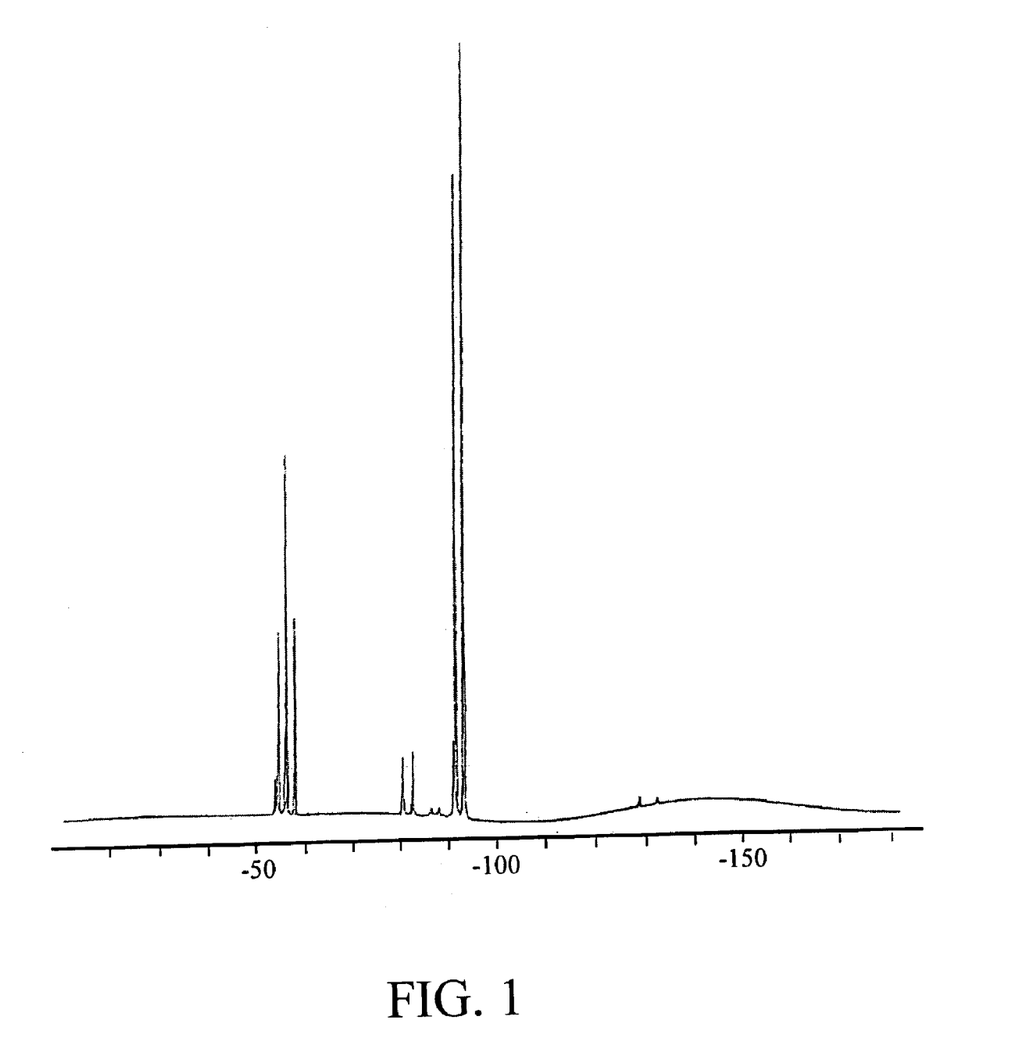
FIG. 1 shows a NMR spectrum of the perfluoroalkyl hyaluronan of Example 2.

The present invention relates to fluorinated biopolymer and polymer derivatives (Formulas I–XX) useful as imaging probes, diagnostic agents and contrast agents. Additionally, the present invention relates to imaging methods employing the present compounds of Formulas I–XX Novel compositions comprising modified biopolymers of the present invention include the compounds of general formula I to VIII and their use as new biomaterials, imaging probes, diagnostic tools and contrast agents:

Where

For Formula I:
$R_1$=H, X; $R_2$=H, X; $R_3$=H, OH, OY, OX, NHX

For Formula II:
$R_1$=H, X; $R_2$=H, X; $R_3$=H, OY, OX, NHX

For Formula III:
$R_1$=H, X; $R_2$=H, X; $R_3$=H, Y, X

For Formula IV:
$R_1$=H, X; $R_2$=H, X; $R_3$=$CO_2H$, $CO_2X$, $CH_2X$, $CH_2NHX$; $R_4$=H, X; $R_5$=H, X; $R_7$=X, $COCH_3$, COX For Formula V:
$R_1$=H, X; $R_2$=H, X; $R_3$=$CO_2H$, $CO_2X$, $CH_2X$, $CH_2NHX$; $R_4$=H, $SO_3H$, X; $R_5$=H, $SO_3H$, X; $R_6$=H, X; $R_7$=$COCH_3$, COX, X For Formula VI:
$R_1$=H, X; $R_2$=H, X; $R_3$=$CO_2H$, $CO_2X$, $CH_2X$, $CH_2NHX$; $R_4$=H, X; $R_5$=$SO_3H$, X; $R_6$=H, X; $R_7$=$COCH_3$, COX, X For Formula VII:
$R_1$=H, X; $R_2$=H, X; $R_3$=H, X; $R_4SO_3H$, X; $R_5$=$SO_3H$, X; $R_6$=H, X; $R_6$=H, X; $R_7$=$COCH_3$, COX, X For Formula VIII:
$R_1$=H, X; $R_2$=H, X; $R_3$=$CO_2H$, $CO_2X$, $CH_2X$, $CH_2NHX$; $R_4$=H, X; $R_5$=H, X; $R_6$=H, X; $R_7$=H, X; $R_8$=$COCH_3$, COX, X

Wherein for all of the above Formulas
X=fluoroalkyl, fluoroaryl, fluoroacyl, perfluoroalkyl, perfluoroaryl, perfluoroacyl, perfluoropolymer, fluoroamine, fluorocarbamate, fluorotriazine, fluorosulfonylalkyl derivatives, $CF_2Cl$, $SO_2[CF_2]_xCF_3$, F, $CF_3$, $COC_xF_y$, $C_xF_yH_z$, $([CH_2]_mO)_x(CH_2CF_2O)_y(CF_2CF_2O)_z(CF_2)_2$ $CF_2CH_2O(CH_2)_pOH$, $CH_2C(OH)C_xF_yH_z$, $C_xF_yH_zO_p$, $COC_xF_yH_z$, $OCH_2C_xF_z[C_xF_zO]_mF$, $CH_2C(CH_3)CO_2C_xH_z$ $(CF_2)_mCF_3$, $CH_2(CF_2O)_x(CF_2CF_2O)_y(CF_2O)_z$ $CF_2CH_2OH$, $COCF(CF_3)$—$[CF(CF_3)CF_2O]_mF$, $NHC_xF_y$-$H_zO_p$, $CH_2CF_2O[CF_2CF_2O]_m(CF_2OCF_2CH_2OH$, $COC_xH_z(CF_2)_mCF_3$, $COCF_2O[CF_2CF_2O]_n$ $CF_2OCF_2CO_2H$, $([CH_2]_mO)_x(CH_2CF_2O)_y(CF_2CF_2O)_z$ $CF_2CH_2O(CH_2)_pOH$, $N[C_xF_yH_z]_p$, $C_xH_zCO_2C_xH_z(CF_2)_m$ $CF_3$, $COC_xF_y[C_pF_zO]_mF$, a luminescent residue, a fluorescent residue, a fluorinated luminescent residue or a fluorinated fluorescent residue and m, x, p, y, z are integers from 1 to 150, and where m is more preferably 10–100, and most preferably 10–50, and where x, p, y, z are more preferably 10–75, even more preferably 10–50, and most preferably 10–20. Acyl and alkyl residues in the above formulas comprise lipophilic moieties, including saturated and unsaturated aliphatic residues with $C_k$ chains, where k is 2 to 100, more preferably 2–50, and most preferably 2–20, and aryl residues comprise aromatic moieties, including benzyl, biphenyl, phenyl polycyclic aromatics, and heteroatom-containing aromatics; and

Y=saccharide branch residue comprised of mono-, di-, oligo- or polysaccharide, fluorinated saccharide branch residue comprised of mono-, di-, oligo- or polysaccharide.

The novel compositions are comprised of modified biopolymers, wherein said biopolymers include biopolymers that are selected from the group consisting of amylose, cellulose, dextran, dextrins, galactan, β-glucans, glycosaminoglycans, including chondroitin sulfate, dermatan sulfate, heparan sulfate, heparin, hyaluronate, and keratin sulfate, maltodextrins, mannans, pustulan, starch, xylans and their copolymers, linear or cyclic oligomers, hybrids, salts and derivatives.

Novel compositions comprising modified biopolymers of the present invention include the compounds of general formula IX to XII and are disclosed herein as new biomaterials, imaging probes, diagnostic tools and contrast agents:

-continued

XII wherein

For Formula IX:
$R_1$=H, X, Z; $R_2$=H, X, Z; $R_3$=H, X; $R_4$=H, X, Z; $R_5$=H, X; $R_6$=H, X; $R_7$=H, X, Z For Formula X:
$R_1$=H, X, $CH_2OGOCO_2H$, $CH_2OGCO_2X$, $CH_2OGCONX$, $CH_2OGCH_2NX$; $R_2$=H, X, Z; $R_3$=H, X, $CH_2OGOCO_2H$, $CH_2OGCO_2X$, $CH_2OGCONX$, $CH_2OGCH_2NX$; $R_4$=H, $COCH_3$, COX, X, $CH_2OGOCO_2H$, $CH_2OGCO_2X$, $CH_2OGCONX$, $CH_2OGCH_2NX$ For Formula XI:
$R_1$=H, OH, X, OX, OZ, $CH_2OGOCO_2H$, $CH_2OGCO_2X$, $CH_2OGCONX$, $CH_2OGCH_2NX$; $R_2$=H, OH, X, OX, OZ, $CH_2OGOCO_2H$, $CH_2OGCO_2X$, $CH_2OGCONX$, $CH_2OGCH_2NX$; $R_3$=$CH_2OH$, $CH_2OX$, $CH_2OZ$, $CH_2X$, $CH_2NHX$, $CO_2H$, $CO_2X$, CONX, $CH_2OGOH$, $CH_2OGOX$, $CH_2OGOCO_2H$, $CH_2OGCO_2X$, $CH_2OGCONX$, $CH_2OGCH_2NX$; $R_4$=OH, Z, OX, X; G=alkyl, hydroxyalkyl For Formula XII:
K=H, OH, X, OX, OZ; L=H, OH, X, OX, OZ; W=H, OH, X, OX, OZ; T=H, OH, X, OX, OZ; V=anhydrofuranosyl, anhydropyranosyl, and m, n, p, q, r=1–500 inclusive; n=1–8 inclusive.

Wherein for all of the above Formulas
X=fluoroalkyl, fluoroaryl, fluoroacyl, perfluoroalkyl, perfluoroaryl, perfluoroacyl, perfluoropolymer, fluoroamine, fluorocarbamate, fluorotriazine, fluorosulfonylalkyl derivatives, F, $CF_2Cl$, $SO_2[CF_2]_xCF_3$, $CF_3$, $COC_xF_y$, $C_xF_yH_z$, $([CH_2]_mO)_x(CH_2CF_2O)_y(CF_2CF_2O)_z(CF_2)_2$ $CF_2CH_2O(CH_2)_pOH$, $CH_2C(OH)C_xF_yH_z$, $C_xF_yH_zO_p$, $COC_xF_yH_z$, $OCH_2C_xF_z[C_xF_zO]_mF$, $CH_2C(CH_3)CO_2C_xH_z$ $(CF_2)_mCF_3$, $CH_2(CF_2O)_x(CF_2CF_2O)_y(CF_2O)_z$ $CF_2CH_2OH$, $COCF(CF_3)$—$[CF(CF_3)CF_2O]_mF$, $NHC_xF_y$-$H_zO_p$, $CH_2CF_2O[CF_2CF_2O]_m(CF_2OCF_2CH_2OH$, $COC_xH_z(CF_2)_mCF_3$, $COCF_2O[CF_2CF_2O]_n$ $CF_2OCF_2CO_2H$, $([CH_2]_mO)_x(CH_2CF_2O)_y(CF_2CF_2O)_z$ $CF_2CH_2O(CH_2)_pOH$, $N[C_xF_yH_z]_p$, $C_xH_zCO_2C_xH_z(CF_2)_m$ $CF_3$, $COC_xF_y[C_pF_zO]_mF$, a luminescent residue, a fluorescent residue, a fluorinated luminescent residue or a fluorinated fluorescent residue and m, x, p, y, z are integers from 1 to 150, and where m is more preferably 10–100, and most preferably 10–50, and where x, p, y, z are more preferably 10–75, even more preferably 10–50, and most preferably 10–20. Acyl and alkyl residues in the above formulas comprise lipophilic moieties, including saturated and unsaturated aliphatic residues with $C_k$ chains, where k is 2 to 100, more preferably 2–50, and most preferably 2–20, and aryl residues comprise aromatic moieties, including benzyl, biphenyl, phenyl polycyclic aromatics, and heteroatom-containing aromatics.

Y=saccharide branch residue comprised of mono-, di-, oligo- or polysaccharide, fluorinated saccharide branch residue comprised of mono-, di-, oligo- or polysaccharide.

Z=acyl, alkyl

The present compositions are comprised of modified biopolymer that include biopolymers that are selected from the group consisting of linear, branched, cyclic, ionic or neutral glycans, such as acacia, agar, alginate, arabinogalactans, arabinoxylans, carageenans, cyclodextrins, fructooligosaccharides, fucoidan, gellan, galactomannans, glucomannans, inulins, pectin, pullulan, tragacanth, xanthan, and xyloglucans, carboxyalkyl glycans, such as carboxymethyl cellulose, carboxymethyl chitosan, and carboxymethyl dextran, glycan esters, such as cellulose acetate, cellulose phosphate, cellulose sulphate and starch acetate, aminoglycans, such as chitin, chitosan, emulsan, and poly(galactosamine), hydroxyalkyl glycans, such as hydroxyethyl cellulose, hydroxypropyl cellulose, alkylglycans such as ethylcellulose and methylcellulose, polysialic acid, and their oligomers, hybrids, salts and derivatives.

Novel compounds of this invention include compositions comprising modified biopolymers of general formula XIII as new biomaterials, imaging probes, diagnostic tools and contrast agents:

XIII

Where

For Formula XIII:
K=H, OH, X, OX, OZ, $(Y)_f$; L=H, OH, X, OX, OZ, $(Y)_f$; W=H, $(CH_2)_d$, $CO_2H$, CH, CX, X; T=H, OH, X, OX, OZ; V=$(CH_2)_d$, $CH_2OX$, $CH_2OZ$, $CH_2X$, $CH_2NHX$; S=H, O, X, NHX, $(Y)_f$; T=H, O, X, NHX, $(Y)_f$; $R_1$=H, X and d=1–3; f, n=1–1,500, preferably f, n=100–1,000

Wherein

Wherein for all of the above Formulas
X=fluoroalkyl, fluoroaryl, fluoroacyl, perfluoroalkyl, perfluoroaryl, perfluoroacyl, perfluoropolymer, fluoroamine, fluorocarbamate, fluorotriazine, fluorosulfonylalkyl derivatives, F, $CF_3$, $CF_2Cl$, $SO_2[CF_2]_xCF_3$, $COC_xF_y$, $C_xF_yH_z$, $([CH_2]_mO)_x(CH_2CF_2O)_y(CF_2CF_2O)_z(CF_2)_2$ $CF_2CH_2O(CH_2)_pOH$, $CH_2C(OH)C_xF_yH_z$, $C_xF_yH_zO_p$, $COC_xF_yH_z$, $OCH_2C_xF_z[C_xF_zO]_mF$, $CH_2C(CH_3)CO_2C_xH_z$ $(CF_2)_mCF_3$, $CH_2(CF_2O)_x(CF_2CF_2O)_y(CF_2O)_z$ $CF_2CH_2OH$, $NHC_xF_yH_zO_p$, $CH_2CF_2O[CF_2CF_2O]_m$ $(CF_2OCF_2CH_2OH$, $COC_xH_z(CF_2)_mCF_3$, $CO—CF_2O$ $[CF_2CF_2O]_nCF_2OCF_2CO_2H$, $COCF(CF_3)$—$[CF(CF_3)$ $CF_2O]_mF$, $([CH_2]_mO)_x(CH_2CF_2O)_y(CF_2CF_2O)_z$ $CF_2CH_2O(CH_2)_pOH$, $N[C_xF_yH_x]_p$, $C_xH_zCO_2C_xH_z(CF_2)_m$ $CF_3$, $COC_xF_y[C_pF_zO]_mF$, a luminescent residue, a fluorescent residue, a fluorinated luminescent residue or a fluorinated fluorescent residue and m, x, p, y, z are integers from 1 to 150, and where m is more preferably 10–100, and most preferably 10–50, and where x, p, y, z are more preferably 10–75, even more preferably 10–50, and most preferably 10–20. Acyl and alkyl residues in the above formulas comprise lipophilic moieties, including saturated and unsaturated aliphatic residues with $C_k$ chains, where k is 2 to 100, more preferably 2–50, and most preferably 2–20, and aryl residues comprise aromatic moieties, including benzyl, biphenyl, phenyl polycyclic aromatics, and heteroatom-containing aromatics.

Y=amino acid residue, fluorinated amino acid residue.

Z=acyl, alkyl.

The novel compositions are comprised of modified biopolymers that include biopolymers that are selected from the group consisting of collagens, elastins, gelatins, poly (amino acids), including poly(aspartic acid), poly(glutamic acid), and poly(lysine), biopolyesters, including poly(glycolic acid, poly(hydroxy alkanoates), and poly(lactic acid), their copolymers, oligomers, hybrids, salts and derivatives.

Novel compositions of this invention also include compounds comprising modified polymers of general formula XIV to XX and their use as new biomaterials, imaging probes, diagnostic tools and contrast agents:

Where

For Formula XIV:
$R_1$=H, X; $R_2$=H, Z, X,

For Formula XV:
$R_1$=H, $CH_3$, $(CH_2)_mCH_3$, $CF_3$, $(CF_2)_mCF_3$; $R_2$=H, $CH_3$, $(CH_2)_mCH_3$, $CF_3$, $(CF_2)_mCF_3$; $R_3$=H, $CH_3$, $(CH_2)_mCH_3$, $CF_3$, $(CF_2)_mCF_3$; $R_4$=H, $CH_3$, $(CH_2)_mCH_3$, $CF_3$, $(CF_2)_m$ $CF_3$; $R_5$=H, $CH_3$, $(CH_2)_mCH_3$, $CF_3$, $(CF_2)_mCF_3$, $CH_2X$, $CH_2NHX$; $R_6$=H, $CH_3$, $(CH_2)_mCH_3$, $CF_3$, $(CF_2)_mCF_3$, $CH_2X$, $CH_2NHX$; m=1–10; n=1–3,000.

For Formula XVI:
R$_1$=OH, X, OX, OZ; R$_2$=OH, X, OX, OZ; m, n=1–15,000, preferably m, n=500–2,000.

For Formula XVI:
R$_1$=O, CH$_2$X, CH$_2$NHX, OZ; R$_2$=CH$_3$, (CH$_2$)$_m$CH$_3$; R$_3$=CH$_3$, (CH$_2$)$_m$CH$_3$, CF$_3$, (CF$_2$)$_m$CF$_3$; R$_4$=(CH$_2$)$_n$; R$_5$=(CH$_2$)$_q$; R$_6$=H, OH, OX, X; R$_7$=H, OH, OX, X; m, n=1–30; p, q=0–3,000; preferably p, q=50–500.

For Formula XVII:
R$_1$=O, OX, CF$_3$, (CF$_2$)$_m$CF$_3$; R$_2$=CH$_3$, (CH$_2$)$_n$CH$_3$, CF$_3$, (CF$_2$)$_n$CF$_3$; R$_3$=CH$_3$, (CH$_2$)$_n$CH$_3$, CF$_3$, (CF$_2$)$_n$CF$_3$; R$_4$=(CH$_2$)$_m$; R$_5$=(CH$_2$)$_q$; R$_6$=OH, OX, X; R$_7$=H, X; m=1–2; n=1–10; p, q=1–3,000, preferably p, q=100–1,000.

For Formula XVIII:
R$_1$=H, CH$_3$, (CH$_2$)$_m$CH$_3$, CF$_3$, (CF$_2$)$_m$CF$_3$; R$_2$=H, OH, OX, X; R$_3$=H, OH, OX, X; m=1–30; n=1–3,000, preferably n=500–1,000.

For Formula XIX:
R$_1$=CH$_2$, CH$_2$CH$_2$, CF$_2$, CF$_2$CF$_2$; R$_2$=CH$_2$, CF$_2$; R$_3$=OH, OX, OZ; R$_4$=H, X, Z; where Z=Y[(OCH$_2$CH$_2$)$_m$]$_q$; Y=multidentate core, such as trivalent or tetravalent residues; m, n=1–80,000, preferably m, n=1,000–20,000; q=1–10.

For Formula XX:
R$_1$=H, X; R$_2$=H, X, (CH$_2$CH$_2$N)$_m$, (CH$_2$CH$_2$NX)$_m$; R$_3$=H, X, (CH$_2$CHCH$_2$N)$_m$, (CH$_2$CH$_2$NX)$_m$; R$_4$=H, X, (CH$_2$CH$_2$N)$_m$CH$_2$CH$_2$NH$_2$, (CH$_2$CH$_2$N)$_m$CH$_2$CH$_2$NHX; m=1–3,000; n=5–80,000, preferably n=500–15,000.

Wherein for all of the above Formulas
X=fluoroalkyl, fluoroaryl, fluoroacyl, perfluoroalkyl, perfluoroaryl, perfluoroacyl, perfluoropolymer, fluoroamine, fluorocarbamate, fluorotriazine, fluorosulfonylalkyl derivatives, F, CF$_3$, COC$_x$F$_y$, C$_x$F$_y$H$_z$, ([CH$_2$]$_g$O)$_x$(CH$_2$CF$_2$O)$_y$(CF$_2$CF$_2$O)$_z$(CF$_2$)$_z$CF$_2$CH$_2$O(CH$_2$)$_p$OH, CH$_2$C(OH)C$_x$F$_y$H$_z$, C$_x$F$_y$H$_z$O$_p$, COC$_x$F$_y$H$_z$, OCH$_2$C$_x$F$_z$[C$_x$F$_z$O]$_g$F, CH$_2$C(CH$_3$)CO$_2$C$_x$H$_z$(CF$_2$)$_g$CF$_3$, CH$_2$(CF$_2$O)$_x$ (CF$_2$CF$_2$O)$_y$(CF$_2$O)$_z$CF$_2$CH$_2$OH, CF$_2$Cl, SO$_2$[CF$_2$]$_x$CF$_3$, NHC$_x$F$_y$H$_z$O$_p$, CH$_2$CF$_2$O[CF$_2$CF$_2$O]$_g$(CF$_2$OCF$_2$CH$_2$OH, COC$_x$H$_z$(CF$_2$)$_g$CF$_3$, CO—CF$_2$O[CF$_2$CF$_2$O]$_n$CF$_2$OCF$_2$CO$_2$H, CO—CF(CF$_3$)—[CF(CF$_3$)CF$_2$O]$_g$F ([CH$_2$]$_g$O)$_x$(CH$_2$CF$_2$O)$_y$(CF$_2$CF$_2$O)$_z$CF$_2$CH$_2$O(CH$_2$)$_p$OH, N[C$_x$F$_y$H$_z$]$_p$, C$_x$H$_z$CO$_2$C$_x$H$_z$(CF$_2$)$_g$CF$_3$, COC$_x$F$_y$[C$_p$F$_z$O]$_m$F, a luminescent residue, a fluorescent residue, a fluorinated luminescent residue or a fluorinated fluorescent residue and g, x, p, y, z are integers from 1 to 150, and where g is more preferably 10–100, and most preferably 10–50, and where x, p, y, z are more preferably 10–75, even more preferably 10–50, and most preferably 10–20. Acyl and alkyl residues in the above formulas comprise lipophilic moieties, including saturated and unsaturated aliphatic residues with C$_k$ chains, where k is 2 to 100, more preferably 2–50, and most preferably 2–20, and aryl residues comprise aromatic moieties, including benzyl, biphenyl, phenyl polycyclic aromatics, and heteroatom-containing aromatics.

Z=acyl, alkyl.

The novel compositions are comprised of modified polymers that include polymers that are selected from the group consisting of biocompatible polymers, including poly(acrylates), poly(acrylamides), poly(alkylene glycols), including poly(ethylene glycols), poly(ethylene oxides) and poly(propylene glycols), poly(allylamines), poly(butadienes), poly(caprolactones), poly(ethylene imines), poly(methacrylates), poly(orthoesters), poly(tetrahydrofurans), poly(vinyl pyrrolidones), poly(vinyl acetates), and poly(vinyl alcohols), their copolymers, oligomers, hybrids, salts and derivatives and where acyl and alkyl residues of this disclosure comprise lipophilic moieties, including saturated and unsaturated aliphatic residues with C$_k$ chains, where k is 2 to 100, more preferably 2–50, and most preferably 2–20, and where aryl residues comprise aromatic moieties, including benzyl, biphenyl, phenyl, polycyclic aromatics, and heteroatom-containing aromatics.

The fluorinated and/or paramagnetic polymers of the present invention are used to improve the imaging available in an MRI examination procedure. The method of improving the effectiveness of magnetic resonance imaging (MRI) comprises:
  a. administering an effective amount of one or more fluorinated and/or paramagnetic polymers of claims 1–4 to a patient;
  b. subjecting the patient to an MRI of a tissue/organ where the administered polymer is expected to accumulate; and
  c. evaluating the tissue/organ from the MRI images obtained.

One of ordinary skill in the art would readily be able to evaluate the results of the MRI by observation and/or comparisons to a patient's prior MRI results or standard MRI results used for diagnosis purposes.

DETAILED DESCRIPTION OF THE INVENTION

Compositions of this invention comprised of carbohydrate, polymer and protein residues are obtained by treating the respective starting materials (backbone or substrate moiety) with fluorine moieties employing routine fluorination chemistry such as those described below.

Three general approaches can be employed to prepare the new fluorinated biopolymers of the instant invention: (1) low molecular weight fluorinated substituents can be employed (as illustrated in the Examples); (2) high molecular weight polyfluorinated residues can be employed, such as with functional perfluoropolymers; and (3) fluorinated monomers can be incorporated into polymeric materials by chemical or enzymatic processes. The above approaches permit the preparation of fluorinated biopolymers with a broad range of fluorine substituent types and incorporation levels (5–40% or more as illustrated in the following Examples) that can be tailored to either diagnostic or therapeutic uses. The optimum fluorine content will be determined in each case by the diagnostic requirements for sensitivity on one hand and the extent to which the maximum fluorine substitution does not interfere with the probe's biological or physicochemical properties, e.g., its solubility or receptor binding ability. An important parameter in these considerations will be the type of fluorine substitution and its position on the probe substrate. Generally preferable F levels are 10–40%, and more preferable 20–40%.

Linking of fluorinated residues to biopolymer and polymer starting materials of this invention can be accomplished by a number of reactions, many of which have been described generally in conjugate chemistry (for reviews see, for instance: G. T. Hermanson, *Bioconjugate Chemistry*, Academic Press, New York, 1996; S. S. Wong, *Chemistry of protein conjugation and cross-linking*, CRC Press, Boca Raton, 1993; R. L. Lundblad, *Techniques in Protein Modification*, CRC Press, Boca Raton, 1994; C. F. Meares (ed.), *Perspectives in Bioconjugate Chemistry*, American Chemical Society, Washington, 1993).

A terminal hydroxyl group on the biopolymers and polymers of this disclosure can be allowed to react with bromoacetyl chloride to form a bromoacetyl ester that in turn is allowed to react with an amine precursor to form the —NH—CH₂—C(O)— linkage. A terminal hydroxyl group also can be allowed to react with 1,1'-carbonyl-bisimidazole and this intermediate in turn allowed to react with an amino precursor to form a —NH—C(O)O— linkage (see Bartling et al., *Nature*, 243, 342, 1973). A terminal hydroxyl also can be allowed to react with a cyclic anhydride such as succinic anhydride to yield a half-ester which, in turn, is allowed to react with a precursor of the formula $C_xF_yH_z$—NH₂ using conventional peptide condensation techniques such as dicyclohexylcarbodiimide, diphenylchlorophosphonate, or 2-chloro-4,6-dimethoxy-1,3,5-triazine (see e.g., Means et al., *Chemical Modification of Proteins*, Holden-Day, 1971). A terminal hydroxyl group can also be allowed to react with 1,4-butanediol diglycidyl ether to form an intermediate having a terminal epoxide function linked to the polymer through an ether bond. The terminal epoxide function, in turn, is allowed to react with an amino or hydroxyl precursor (Pitha et al., *Eur. J. Biochem.*, 94, 11, 1979; Elling and Kula, *Biotech. Appl. Biochem.*, 13 354, 1991; Stark and Holmberg, *Biotech. Bioeng.*, 34, 942, 1989).

Halogenation of a hydroxyl group permits subsequent reaction with an alkanediamine such as 1,6-hexanediamine. The resulting product then is allowed to react with carbon disulfide in the presence of potassium hydroxide, followed by the addition of proprionyl chloride to generate a isothiocyanate that in turn is allowed to react with an amino precursor to yield a —N—C(S)—N—(CH₂)₆—NH— linkage (see e.g., Means et al., *Chemical Modification of Proteins*, Holden-Day, 1971).

A carboxylic acid group of the biopolymers and polymers can be activated with N,N'-dicyclohexylcarbodiimide and then allowed to react with an amino or hydroxyl group to form an amide or ether respectively. Anhydrides and acid chlorides will produce the same links with amines and alcohols. Alcohols can be activated by carbonyldiimidazole and then linked to amines to produce urethane linkages. Alkyl halides can be converted to an amine or allowed to react with an amine, diamines, alcohols, or diols. A hydroxy group can be oxidized to form the corresponding aldehyde or ketone. This aldehyde or ketone then is allowed to react with a precursor carrying a terminal amino group to form an imine that, in turn, is reduced with sodium borohydride or sodium cyanoborohydride to form the secondary amine (see Kabanov et al., *J. Controlled Release*, 22, 141, 1992; *Methods Enzymology*, XLVII, Hirs & Timasheff, eds., Academic Press, 1977). The precursor terminating in an amino group can also be allowed to react with an alkanoic acid or fluorinated alkanoic acid, preferably an activated derivative thereof, such as an acid chloride or anhydride, to form a linking group —CONH—. Alternatively, an amino precursor can be treated with an α-ω-diisocyanoalkane to produce a —NC(O)NH(CH₂)₆NHC(O)—N— linkage (see Means, *Chemical Modification of Proteins*, Holden-Day, 1971). Furthermore, linkages that are unsymmetrical, such as —CONH— or —NHCOO—, can be present in the reverse orientation; e.g., —NHCO— and —OCONH—, respectively. Examples of an activated carbonyl group include anhydride, ketone, p-nitrophenylester, N-hydroxysuccinimide ester, pentafluorophenyl ester and acid chloride.

Suitable fluorinated starting materials for making the novel compositions of the present invention include, but are not limited to inorganic fluorinating agents, such as trifluoromethylhypofluorite, sulfur tetrafluoride or potassium fluoride, organic fluorinating agents, such as Selectfluor™, fluoroalkylcarboxylic acids, fluoroalkylaldehydes, anhydrides, esters, ketones, acid chlorides of fluoroalkylcarboxylic acids, such as monofluoroacetic acid, difluoroacetic acid, trifluoroacetic acid, pentafluoro-propionic acid, heptafluorobutyric acid, heptafluorobutyric anhydride, heptafluorobutyrylchloride, nonafluoropentanoic acid, tridecafluoroheptanoic acid, pentadecafluorooctanoic acid, heptadecafluorononanoic acid, nonadecafluorodecanoic acid, perfluorododecanoic acid, perfluorotetradecanoic acid; fluoroalkanols, such as 2,2,3,3,4,4,4-heptafluoro-1-butanol, 2,2,3,3,4,4,5,5,6,6,7,7,8,8,9,9,10,10,11,11,11-heneicosafluoro-1-undecanol, 2,2,3,3,4,4,5,5,6,6,7,7,8,9,9,9-hepta-decafluoro-1-nonanol, 2,2,3,3,4,4,5,5,6,6,7,7,8,8,8-penta-decafluoro-1-octanol, 2,2,3,3,4,4,5,5,6,6,7,7,8,8,9,9,10,10,10-nonadeca-fluoro-1-decanol, Krytox and Zonyl derivatives, fluoroarylesters, fluoroalkylamines, fluoroarylamines, fluorinated polymers containing reactive terminal groups, fluoroalkyl halides, such as perfluoroethyl iodide, perfluoropropyl iodide, perfluorohexyl bromide, perfluoroheptyl bromide, perfluorooctyl bromide, perfluorodecyl iodide, perfluorooctyl iodide, 1,1,1,2,2,3,3,4,4,5,5,6,6,7,7,8,8-heptadecafluoro-10-iododecane, 1,1,1,2,2,3,3,4,4,5,5,6,6,7,7,8,8-heptadecafluoro-10-iododecane, polytetrafluoroethyleneoxide-co-difluoromethyleneoxide-α,ω-bis (methylcarboxylate), dihydroxy-propanoxymethyl derivatives of perfluoropolyoxyalkane, hydroxypolyethylenoxy derivatives of perfluoropolyoxyalkane and the like. Suitable modification procedures have been described in several monographs (J. J. Clark, D. Walls. T. W. Bastock, *Aromatic Fluorination*, CRC Press, Boca Raton, Fla., 1996; M. Hudlicky, A. E. Pavlath, *Chemistry of Organic Fluorine Compounds*, ACS, Washington, bc 1995; M. Howe-Grant ed., *Fluorine Chemistry, A Comprehensive Treatment*, Wiley, New York, 1995; G. A. Olah, G. K. Sarya Prakash, R. D. Chambers, eds. *Synthetic Fluorine Chemistry*, Wiley, New York, 1992).

The present invention also contemplates paramagnetic polymers for those polymers capable of forming salts or conjugates with paramagnetic ions. Suitable paramagnetic ions include any paramagnetic ion of the transition metal or lanthanide series, including gadolinium (III), iron (III), manganese (II and III), chromium (III), copper (II), dysprosium (III), terbium (III), holmium (III), erbium (III), and europium (III); most preferred are gadolinium (III), dysprosium (III), iron (III), and manganese (II). The magnetic materials of this invention can be used as contrast-enhancing agents for in vivo MR imaging and magnetic resonance angiography.

Specific compounds of Formulas I–XX may require the use of protecting or blocking groups to enable their successful elaboration into the desired structure. Protecting groups may be chosen with reference to Greene, T. W., et al., *Protective Groups in Organic Synthesis*, John Wiley & Sons, Inc., 1991. The blocking groups are readily removable, i.e., they can be removed, if needed, by procedures that will not cause cleavage or other disruption of the remaining portions of the molecule. Such procedures include chemical and enzymatic hydrolysis, treatment with chemical reducing or oxidizing agents under mild conditions, treatment with fluoride ion, treatment with a transition metal catalyst and a nucleophile, and catalytic hydrogenation.

Examples of suitable hydroxyl protecting groups are: trimethylsilyl, triethylsilyl, o-nitrobenzyloxycarbonyl, p-nitrobenzyloxycarbonyl, t-butyldiphenylsilyl, t-butyldimethylsilyl, benzyloxycarbonyl, t-butyloxycarbonyl, 2,2,2-trichloroethyloxycarbonyl, and allyloxycarbonyl. Examples of suitable carboxyl protecting groups are benzhydryl, o-nitrobenzyl, p-nitrobenzyl, 2-naphthylmethyl, allyl, 2-chloroallyl, benzyl, 2,2,2-trichloroethyl, trimethylsilyl, t-butyldimethylsilyl, t-butyldiphenylsilyl, 2-(trimethylsilyl) ethyl, phenacyl, p-methoxybenzyl, acetonyl, p-methoxyphenyl, 4-pyridylmethyl and t-butyl.

The compounds used in the method of the invention can be prepared readily according in the following detailed examples using readily available starting materials, reagents and conventional synthetic procedures. Additional variants are also possible that are known to those of ordinary skill in this art, but which are not mentioned in greater detail. The following examples illustrate the practice of the present invention but should not be construed as limiting its scope.

EXAMPLE 1

N-[3-[2-(Perfluorohexyl)-2-ethoxy]-2-hydroxypropyl] γ-Polyglutamic Acid

A solution of 3-[2-(perfluorohexyl)-2-ethoxy]-1,2-epoxypropane in methylene chloride (0.6 equivalents) was added to γ-polyglutamic acid and stirred at ambient temperature for 6 hours. The suspension was filtered, washed with methylene chloride and acetone, dialyzed and dried, yielding 3-[2-(perfluorohexyl)-2-ethoxy]-2-hydroxypropyl γ-polyglutamic acid with F 13.38%.

m=1–70,000
n=70,00–1

EXAMPLE 2

3-[2-(Perfluorohexyl)-2-ethoxy]-2-hydroxypropyl Hyaluronic Acid

An aqueous solution of hyaluronic acid was treated with 3-[2-(perfluorohexyl)-2-ethoxy]-1,2-epoxypropane (0.6 equivalents) and the resulting viscous paste was stirred at ambient temperature for 6 hours. The reaction mixture was precipitated with acetone, washed with acetone, filtered, dialyzed and dried, yielding 3-[2-(perfluorohexyl)-2-ethoxy]-2-hydroxypropyl hyaluronate with F 33.12%.

R=H, $CF_3(CF_2)_6O(CH_2)_2OCH_2CH(OH)CH_2$—
n=1–4,000

EXAMPLE 3

3-[2-(Perfluorohexyl)-2-ethoxy]-2-hydroxypropyl Maltodextrin

An aqueous solution of maltodextrin was treated with NaOH (1.3 equivalents) and then with 3-[2-(perfluorohexyl)-2-ethoxy]-1,2-epoxypropane in DMSO (0.6 equivalents) and the resulting viscous paste was stirred at ambient temperature for 6 hours. The reaction mixture was precipitated with acetone, washed with acetone, filtered, dialyzed and dried, yielding 3-[2-(perfluorohexyl)-2-ethoxy]-2-hydroxypropyl maltodextrin with F 21.52%.

R=H, $CF_3(CF_2)_6O(CH_2)_2OCH_2CH(OH)CH_2$
n=5–1,000

EXAMPLE 4

Perfluorophenylhydrazone Carboxymethyl Cellulose

A solution of perfluorophenylhydrazine in DMSO (0.6 equivalents) was added to an aqueous solution of carboxymethyl cellulose and stirred at ambient temperature for 6 hours. The suspension was filtered, washed with methylene chloride and acetone, dialyzed and dried, yielding perfluorophenylhydrazone CMC with F 18.94%.

R=H, $CH_2CO_2H$, $CH_2C=NNHC_6F_5$
n=20–10,000

EXAMPLE 5

Di-α,ω-(heptafluorobutyryl) Polyethylene Glycol

A solution of heptafluorobutyryl chloride in dioxane (0.6 equivalents) was added to polyethylene glycol (Mw 1,000) in dioxane containing triethylamine (0.6 equivalents) and stirred at ambient temperature for 6 hours. The reaction mixture was precipitated in ether, and the crude fluorinated PEG product was chromatographed on silica gel, yielding heptafluorobutyryl PEG with F 19.95%.

$CH_2F(CF_2)_3[OCH_2CH_2]_nO(CF_2)_3CH_2F$
n=1–50,000

EXAMPLE 6

Perfluoroaniline Hyaluronate

A solution of perfluoroaniline (1.6 equivalents) in DMSO was added to an aqueous solution of sodium hyaluronate and stirred at 40° C. for 4 hours. The reaction mixture was cooled, treated with sodium cyanoborohydride (10 equivalents) for 9 hours, precipitated with acetone, washed with acetone, filtered, dialyzed and dried, yielding perfluoroaniline hyaluronate with F 17.75%.

n=1–4,000

EXAMPLE 7

Perfluorohexanoate Hyaluronate

Sodium hyaluronate was dissolved in water and the pH of the solution was adjusted to pH 4.75 by addition of 0.1 N HCl. Then EDC (1.5 equivalents) was added followed by methylperfluorohexanoate methyl ester (1.05 equivalents). The pH of the reaction mixture then rises to 6.2 over two hours. The reaction mixture was kept at room temperature for five hours, after which it forms a thick insoluble hydrogel. This hydrogel is dialyzed with a 1 M NaCl solution and lyophilized to yield perfluorohexanoate hyaluronate F 29.52%.

n=1–8,000

EXAMPLE 8

Trifluoroacetate Hydroxypropyl Cellulose

A solution of ethyl trifluoroacetate in pyridine (1.6 equivalents) was added to a pyridine solution of hydroxypropyl cellulose and stirred at ambient temperature for 9 hours. The solution was precipitated in ice water, filtered, washed with methanol and acetone, dialyzed and dried, yielding trifluoroacetate hydroxypropyl cellulose with F 34.56%.

R=H, $OCOCF_3$, $CH_2CH(OCOCF_3)CH_3$
n=3–10,000

EXAMPLE 9

3-(Perfluoro-n-octyl)-2-hydroxypropyl Hyaluronic Acid

An aqueous solution of hyaluronic acid was treated with 3-(perfluoro-n-octyl)-1,2-epoxypropane (1.2 equivalents) and the resulting viscous paste was stirred at ambient temperature for 6 hours. The reaction mixture was precipitated with acetone, washed with acetone, filtered, dialyzed and dried, yielding 3-(perfluoro-n-octyl)-2-hydroxypropyl hyaluronate with F 31.52%.

R=H, $CF_3(CF_2)_7CH_2CH(OH)CH_2$
n=1–4,000

EXAMPLE 10

Perfluoro-2,5,8,11-tetramethyl-3,6,9,12-tetraoxopentadecanoate Hyaluronic Acid

An aqueous solution of hyaluronic acid was treated with perfluoro-2,5,8,11-tetramethyl-3,6,9,12-tetraoxopentadecanoic acid methyl ester (1.2 equivalents) and catalytic amounts of sulfuric acid and the resulting viscous paste was stirred at ambient temperature for 14 hours. The reaction mixture was washed with acetone, filtered, dialyzed and dried, yielding perfluoro-2,5,8,11-tetramethyl-3,6,9,12-tetraoxopentadecanoate hyaluronate with F 34.65%.

R=H, COCF$_2$(CF$_3$)[OCF$_2$CF(CF$_3$)]$_3$O(CF$_2$)$_2$CF$_3$
n=1–8,000

EXAMPLE 11

4,4,4-Trifluoro-3-hydroxy-3-(trifluoromethyl)butanoate Hydroxypropyl Cellulose

An aqueous solution of 4,4,4-trifluoro-3-hydroxy-3-(trifluoromethyl)butyric acid (3.2 equivalents) was acidified to pH 4.75 and treated with EDC (3.5 equivalents) followed by hydroxypropyl cellulose in water and the resulting viscous paste was stirred at ambient temperature for 14 hours. The reaction mixture was dialyzed and lyophilized, yielding 4,4,4-trifluoro-3-hydroxy-3-(trifluoromethyl)butanoate hydroxypropyl cellulose with F 28.76%.

R=H, OCOCH(OH)(CF$_3$)$_2$, CH$_2$CH[OCOCH(OH)(CF$_3$)$_2$]CH$_3$
n=3–10,000

EXAMPLE 12

4,4,4-Trifluoro-3-hydroxy-3-(trifluoromethyl)butanoate Dextran

An aqueous solution of 4,4,4-trifluoro-3-hydroxy-3-(trifluoromethyl)butyric acid (4.2 equivalents) was acidified to pH 4.75 and treated with EDC (4.5 equivalents) followed by dextran (Mw 500,000) in water and the resulting paste was stirred at ambient temperature for 14 hours. The reaction mixture was precipitated with acetone, filtered, redissolved in water, dialyzed and lyophilized, yielding 4,4,4-trifluoro-3-hydroxy-3-(trifluoromethyl)butanoate dextran with F 24.57%.

R=H, O[COCH(OH)(CF$_3$)$_2$]CH$_3$
n=2–25,000

EXAMPLE 13

Trifluoroacetate Collagen

A solution of ethyl trifluoroacetate in pyridine (1.6 equivalents) was added to a pyridine solution of collagen and stirred at ambient temperature for 6 hours. The solution was dialyzed and lyophilized, yielding trifluoroacetate collagen with F 23.16%.

R=H, COCF$_3$; R$_1$=H, OH, OCOCF$_3$;
R$_2$=H, CH$_3$; R$_3$=OH, OCOCF$_3$, NHR$_1$
m=0.1–0.2 n=0.25–0.4 p=0.1–0.2 wherein m+n+p=~0.5

EXAMPLE 14

Trifluoroacetate Poly(Vinyl Alcohol)

A solution of trifluoroacetic anhydride in pyridine (1.2 equivalents) was added to a pyridine solution of poly(vinyl alcohol) (Mw 30,000) and stirred at ambient temperature for 6 hours. The solution was precipitated with ice water, dialyzed and lyophilized, yielding trifluoroacetate PVA with F 39.98%.

m=20–10,000

EXAMPLE 15

Heptafluorobutyryl Polyethylene Imine

A solution of heptafluorobutyryl chloride in DMSO (2.6 equivalents) was added to a DMSO solution of polyethylene imine (Mw 70,000) containing triethylamine (2.6 equivalents) and stirred at ambient temperature for 6 hours. The reaction mixture was dialyzed, yielding heptafluorobutyryl PEI with F 45.35%.

-continued

[N(CF$_2$)$_3$CH$_2$F]$_2$ m=0–0.3 n=0.1–1.0 p=0–0.3 v=0–0.3 wherein m+n+p+v=1

EXAMPLE 16

Superparamagnetic Iron Oxide Hyaluronate Particles

To a stirred dispersion of superfine iron oxide particles (3 nanometer, 0.5 g) in water (50 mL) was added an aqueous solution of sodium hyaluronate (50 mg, 5 mL). The dispersion was sonicated, centrifuged and the supernatant filtered through 0.22 μm filter. A magnetization curve revealed that the hyaluronate particles were superparamagnetic.

EXAMPLE 17

Paramagnetic Gadolinium Hyaluronate Beads

To a rapidly stirred, aqueous solution of gadolinium (III) acetate (1.1 equivalents) was added dropwise an aqueous solution of sodium hyaluronate through a syringe. The resulting gel beads were centrifuged, dialyzed and lyophilized. A magnetization curve revealed that the hyaluronate particles were paramagnetic.

Use of New Biocompatible Materials and Probes

The fluorine-modified biopolymers of the instant invention are useful as diagnostic tools (MRI, NMR and the like). As illustrated by the Examples, the methods of the instant invention permit the preparation of diagnostic agents with dual functionalities. Thus, the simultaneous incorporation of $^{19}$F or superparamagnetic residues and fluorescent moieties into biopolymers and polymers affords diagnostic probes that can be employed for both MRI and fluorescent studies. Examples of such dual function diagnostic probes are those biopolymers and polymers that contain both a fluorine moiety as described herein and a fluorescent moiety or a fluorinated fluorescent moiety such as: 4-trifluoromethyl-7-aminocoumarin, 4-trifluoromethyl-umbelliferone (or its acetate or butyrate derivatives), 4-fluoro-7-sulfamyl-benzofurazam, certain BODIPY dyes, e.g., N-(4,4'-difluoro-5,7-dimethyl-4-bora-3a,4a-diaza-s-indacene-3-yl)-methyliodoacetamide, N-(4,4'-difluoro-1,3,5,7-tetramethyl-4-bora-3a,4a-diaza-s-indacene-2-yl)-iodoacetamide and 4,4'-difluoro-5-phenyl-4-bora-3a,4a-diaza-s-indacene-3-propionic acid, 3-chloro-1-(3-chloro-5-(trifluoromethyl)-2-pyridimyl)-5-(trifluoromethyl)-2[1H]-pyridinone, 6-carboxymethylthio-2',4',5,7'-tetrabromo-4,5,7-trifluorofluorescein (Eosin F3S), and Oregon Green carboxylic acid.

The fluorinated polymers of the present invention display sensitivity in their $T_1$ relaxation times to different oxygen partial pressures (pO$_2$), producing linear correlation over a range of pO$_2$. This demonstrates their potential utility as oxygen sensitive imaging probes. The fluorinated polymers also display chemical shift and temperature sensitivity, indicating their utility as temperature sensitive imaging probes. These novel agents of this invention are suitable for many diagnostic uses, and provide the ability to image in vivo or non-invasively monitor tissues, organs and cellular implants, for example, pancreatic islet β-cells that are encapsulated with the present fluorinated polymers, and measure their mass, function, viability or evidence of inflammation. Additionally, engraftment of transplanted isolated pancreatic islets can be monitored, using, for example, islets labeled with β-cell specific oxygen-sensitive fluorinated probes. $^{19}$F-MRI with these novel agents permits monitoring of other disorders, such as cancer, the comparison of normal or diseased cells, organs or tissues, the viability of transplanted cells or other tissues when those fluorinated agents have specificity for target tissues. This new methodology is instrumental in the development of clinical examinations for monitoring disease progress and response to therapy in diabetics and in people strongly at risk for diabetes and other patient populations.

The paramagnetic polymers of the present invention are used as contrast agents and are administered orally (or elsewhere in the gastrointestinal tract), intravascularly or intraperitoneally in physiological buffer or other physiologically acceptable carriers. The dosage depends on the sensitivity of the NMR imaging instrumentation and on the composition of the contrast agent. Thus, a contrast agent containing a highly paramagnetic substance, e.g., gadolinium (III), generally requires a lower dosage than a contrast agent containing a paramagnetic substance with a lower magnetic moment, e.g., iron (III). In general, dosage will be in the range of about 0.001–1 mmol/kg, more preferably about 0.01–0.1 mmol/kg. In one embodiment, the products are dispersed in a suitable injection medium, such as distilled water or normal saline, to form a dispersoid that is introduced into the subject's vascular system by intravenous injection. The particles are then carried through the vascular system to the target organ where they are taken up.

When intravascularly administered, the paramagnetic compounds will be preferentially taken up by organs which ordinarily function to cleanse the blood of impurities, notably the liver, spleen, and lymph nodes, and the other organs which tend to accumulate such impurities, notably bone and neural tissue and to some extent, lung. In each of these organs and tissues, the uptake into the reticuloendothelial cells will occur by phagocytosis, wherein the paramagnetic compounds enter the individual cells in membrane-bound vesicles; this permits a longer half-life in the cells, as such membrane-bound paramagnetic compounds will not tend to clump or aggregate (aggregates are rapidly metabolized and cleared from the organ/tissue). Other uptake mechanisms are possible, e.g., pinocytosis. Also, it is possible that the other cells of the liver (hepatocytes) may absorb the paramagnetic componds. Because cancerous tumor cells can lack the ability of phagocytic uptake, the intravascularly administered particles can serve as valuable tools in the diagnosis of cancer in the above-mentioned organs, as tumors will be immediately distinguishable on any image obtained. In another embodiment, the paramagnetic compounds are administered as dispersoids into the gastrointestinal tract, which includes the esophagus, stomach, large and small intestine, either orally, by intubation, or by enema, in a suitable medium such as distilled water. The paramagnetic compounds are preferentially absorbed by the cells of the tract, especially those of the intestine and, like the intravascularly introduced paramagnetic compounds, will exert an effect on $T_2$ of the organ or tissue. In this manner, cancers and other debilitating diseases of the digestive system such as ulcers can be diagnosed and affected areas pinpointed.

The new compositions of this disclosure also display unusual surfactant and emulsification properties.

All patents, patent applications, provisional applications, and publications referred to or cited herein are incorporated by reference in their entirety, including all figures and tables, to the extent they are not inconsistent with the explicit teachings of this specification.

REFERENCES

1. U.S. Pat. No. 6,019,959 Feb. 1, 2000. Oligomeric compounds that contain perfluoroalkyl, process for their production, and their use in NMR diagnosis
   INVENTOR(S)—Platzek, Johannes; Niedballa, Ulrich; Raduchel, Bernd; Schlecker, Wolfgang; Weinmann, Hanns-Joachim; Frenzel, Thomas; Misselwitz, Bernd; Ebert, Wolfgang
   PATENT ASSIGNEE(S)—Schering Aktiengesellschaft
2. U.S. Pat. No. 5,798,406 dated Aug. 25, 1998. Fluorinated acrylic and methacrylic latices and mixtures thereof, processes for manufacturing them and their applications in the field of hydrophobic coatings
   INVENTOR(S)—Feret; Bruno; Sarrazin; Laure; Vanhoye; Didier
   PATENT ASSIGNEE(S)—Elf Atochem S.A
3. U.S. Pat. No. 5,902,795, 1999. Oligosaccharides reactive with hyaluronan-binding protein, monoclonal antibodies recognizing hyaluronan-binding protein, and use in cancer therapy
   INVENTOR(S)—B. P. Toole, S. D. Banerjee
   PATENT ASSIGNEE(S)—
4. U.S. Pat. No. 6,218,464 dated Apr. 17, 2001 Preparation of fluorinated polymers
   INVENTOR(S)—Parker, Hsing-Yeh; Lau, Willie; Rosenlind, Erik S.
   PATENT ASSIGNEE(S)—Rohm and Haas Company
5. U.S. Pat. No. 5,652,347 dated: Jul. 29, 1997 Method for making functionalized derivatives of hyaluronic acid
   INVENTOR(S)—Pouyani, Tara; Prestwich, Glenn D.
   PATENT ASSIGNEE(S)—The Research Foundation of State University of New York
6. U.S. Pat. No. 6,203,777 dated Mar. 20, 2001 Method of contrast enhanced magnetic resonance imaging using carbohydrate particles
   INVENTOR(S)—Schroder, Ulf
   PATENT ASSIGNEE(S)—Nycomed Imaging AS (Oslo, NO)
7. U.S. Pat. No. 5,824,335 dated Oct. 20, 1998 Non-woven fabric material comprising auto-crosslinked hyaluronic acid derivatives
   INVENTOR(S)—Dorigatti, Franco; Callegaro, Lanfranco; Romeo, Aurelio
   PATENT ASSIGNEE(S)—
8. U.S. Pat. No. 6,245,319 dated Jun. 12, 2001 Colloidal dispersions of perfluoropentane
   INVENTOR(S)—Quay, Steven C.
   PATENT ASSIGNEE(S)—Sonus Pharmaceuticals, Inc.
9. U.S. Pat. No. 5,155,194 dated Oct. 13, 1992 Hydrogels based on fluorine-containing and saccharide monomers
   INVENTOR(S)—Kossmehl, Gerhard; Schafer, Horst; Klaus; Norbert, Volkheimer; Jurgen; Rezaii-Djafari, Madjid
   PATENT ASSIGNEE(S)—Ciba-Geigy Corporation
10. U.S. Pat. No. 6,274,677 dated Aug. 14, 2001 Process for the producing perfluorovinyl ethersulfonic acid derivatives and copolymer of the same
    INVENTOR(S)—Tatemoto; Masayoshi
    PATENT ASSIGNEE(S)—Daikin Industries Ltd.
11. U.S. Pat. No. 6,156,937 dated Dec. 5, 2000 Functionalized fluoropolyethers
    INVENTOR(S)—Marchionni, Giuseppe; Gavezotti, Piero; Strepparola, Ezio
    PATENT ASSIGNEE(S)—Ausimont S.p.A.
12. U.S. Pat. No. 6,054,492 dated Apr. 25, 2000 Fluorinated copolymeric pharmaceutical adjuncts
    INVENTOR(S)—Kabanov, Alexander V.; Vinogradov, Serguei V.
    PATENT ASSIGNEE(S)—Supratek Pharma Inc.

I claim:

1. A fluorinated biopolymer comprising:
   a. 3-[2-(perfluorohexyl)-2-ethoxy]-2-hydroxypropyl γ-polyglutamic acid of the formula:

m=1–70,000
n=70,000–1
wherein $[m+n=1]_q$ q=5–70,000.

* * * * *